US011864301B2

(12) United States Patent
Greenland et al.

(10) Patent No.: US 11,864,301 B2
(45) Date of Patent: Jan. 2, 2024

(54) MONOLITHIC X-RAY SOURCE HOUSING

(71) Applicant: Moxtek, Inc., Orem, UT (US)

(72) Inventors: Kasey Otho Greenland, South Jordan, UT (US); Dan Paas, Spanish Fork, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 18/133,758

(22) Filed: Apr. 12, 2023

(65) Prior Publication Data

US 2023/0254962 A1 Aug. 10, 2023

Related U.S. Application Data

(63) Continuation of application No. 17/734,367, filed on May 2, 2022, now Pat. No. 11,659,645.

(60) Provisional application No. 63/195,300, filed on Jun. 1, 2021.

(51) Int. Cl.

| | |
|---|---|
| ***H05G 1/06*** | (2006.01) |
| ***H01J 35/16*** | (2006.01) |
| *H01J 35/08* | (2006.01) |
| *H05G 1/10* | (2006.01) |

(52) U.S. Cl.

CPC ............... *H05G 1/06* (2013.01); *H01J 35/16* (2013.01); *H01J 35/116* (2019.05); *H05G 1/10* (2013.01)

(58) Field of Classification Search

CPC ................................... H05G 1/06; H01J 35/16

See application file for complete search history.

(56) References Cited

U.S. PATENT DOCUMENTS

| | | | | |
|---|---|---|---|---|
| 2,547,996 A | | 4/1951 | Boucher | |
| 3,171,029 A | | 2/1965 | Boucher | |
| 5,304,792 A | | 4/1994 | Verat et al. | |
| 7,079,624 B1 | | 7/2006 | Miller et al. | |
| 7,687,790 B2 | | 3/2010 | Utschig et al. | |
| 9,892,883 B2 | | 2/2018 | Anno et al. | |
| 2003/0021377 A1 | * | 1/2003 | Turner | G01N 23/223 378/102 |
| 2004/0227272 A1 | * | 11/2004 | Saito | B29C 45/561 425/129.1 |
| 2019/0131103 A1 | | 5/2019 | Tuohimaa | |
| 2020/0058462 A1 | | 2/2020 | Suzuki | |

FOREIGN PATENT DOCUMENTS

KR 2015125465 A * 11/2015

* cited by examiner

*Primary Examiner* — Chih-Cheng Kao

(74) *Attorney, Agent, or Firm* — Thorpe North & Western, LLP.

(57) ABSTRACT

A monolithic housing for an x-ray source can wrap at least partially around a power supply and an x-ray tube. The monolithic housing can include Al, Ca, Cu, Fe, Mg, Mn, Ni, Si, Sr, Zn, or combinations thereof. Mg can be a major component of the monolithic housing. The monolithic housing can be formed by injection molding. The monolithic housing can provide one or more of the following advantages: (a) light weight (for easier transport), (b) high electrical conductivity (to protect the user from electrical shock), (c) high thermal conductivity (to remove heat generated during use), (d) corrosion resistance, (e) high strength, and (f) high electromagnetic interference shielding (to shield power supply components from external noise, to shield other electronic components from power supply noise, or both).

20 Claims, 9 Drawing Sheets

MONOLITHIC X-RAY SOURCE HOUSING

CLAIM OF PRIORITY

This application is a continuation of U.S. patent application Ser. No. 17/734,367, filed on May 2, 2022, which claims priority to U.S. Provisional Patent Application No. 63/195,300, filed on Jun. 1, 2021, which are incorporated herein by reference.

FIELD OF THE INVENTION

The present application is related to x-ray sources.

BACKGROUND

An x-ray source can include an x-ray tube electrically coupled to a high voltage power supply. The power supply can provide a large bias voltage for the x-ray tube. The large voltage, between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

Figure 1:
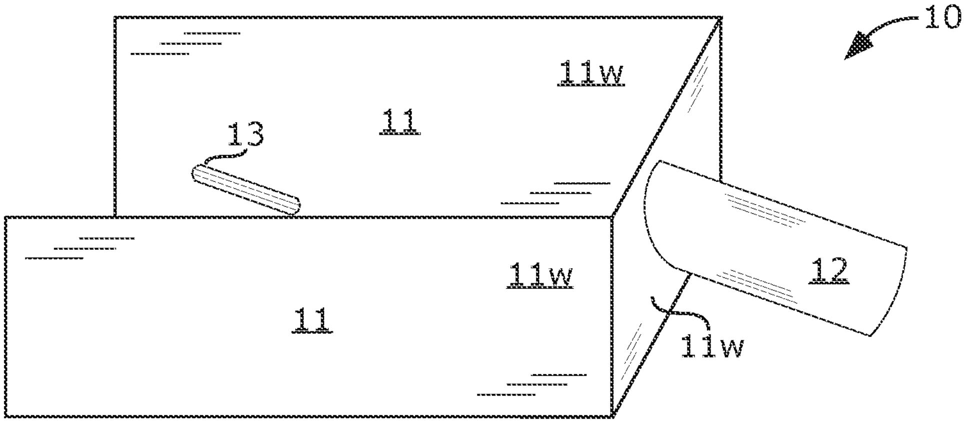

FIG. 1 is a perspective-view of a monolithic housing 10 for an x-ray source. The monolithic housing 10 can include a power supply casing 11 and an x-ray tube casing 12. The power supply casing 11 can be shaped to wrap at least partially around a power supply 31 and the x-ray tube casing 12 can be shaped to wrap at least partially around an x-ray tube 32 (see FIGS. 3-4).

Figure 2:
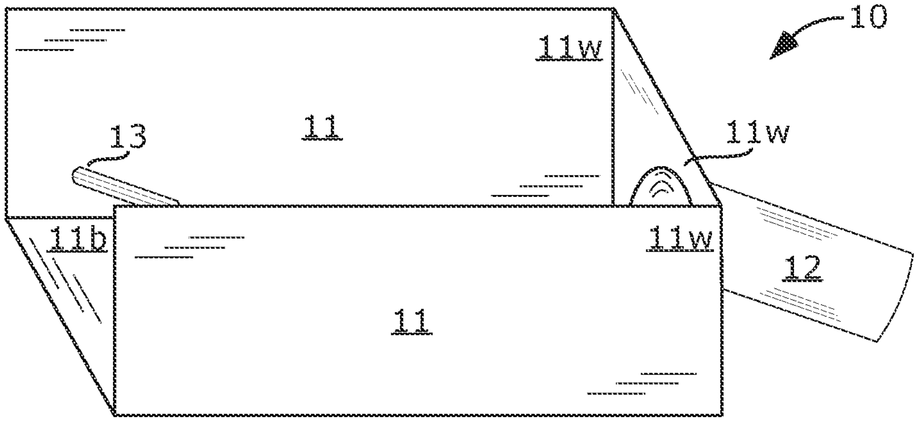

FIG. 2 is a perspective-view of the monolithic housing 10 of FIG. 1, illustrated at a different angle.

Figure 3:
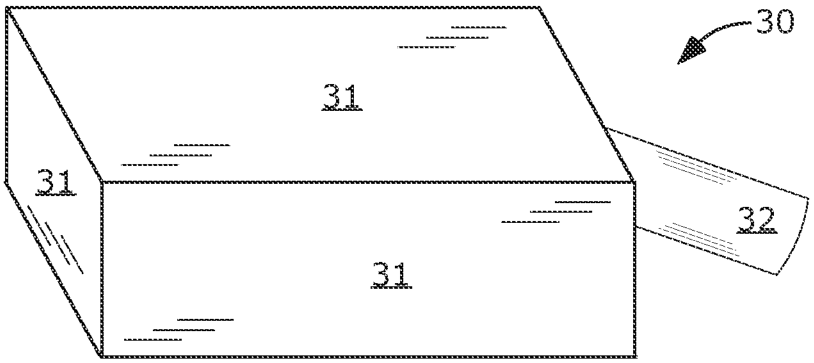

FIG. 3 is a perspective-view of an x-ray source 30 with a power supply 31 and an x-ray tube 32.

Figure 4:
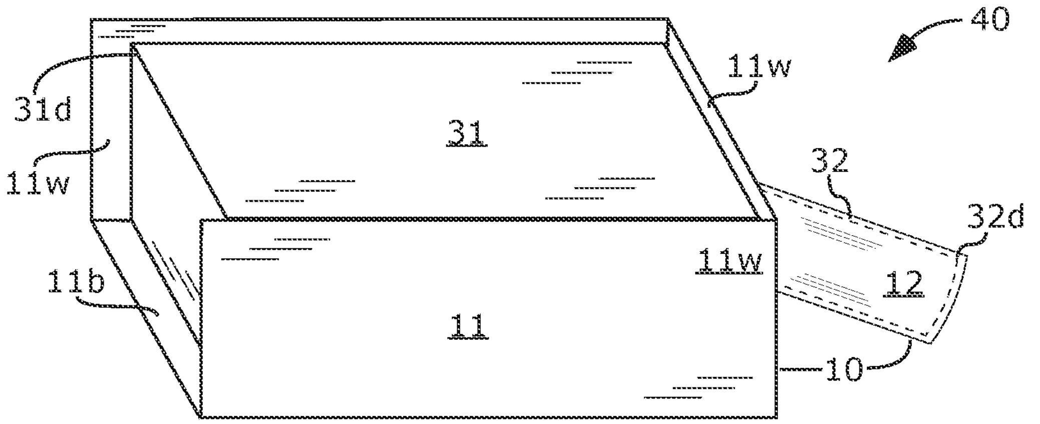

FIG. 4 is a perspective-view of an x-ray source 40 with the power supply 31 inside of the power supply casing 11 and the x-ray tube 32 inside of the x-ray tube casing 12.

Figure 5:
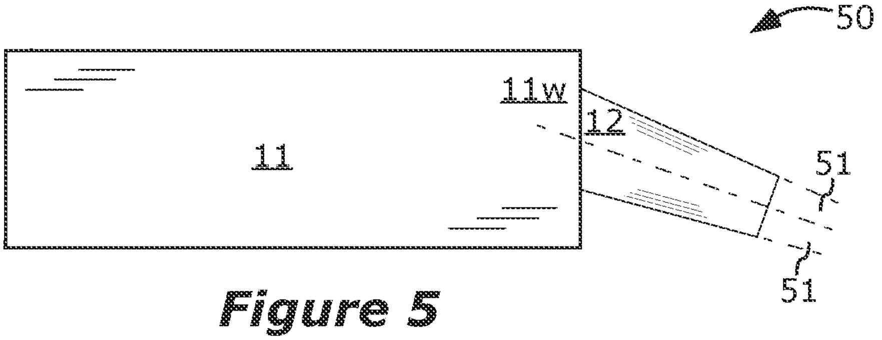

FIG. 5 is a side-view of a monolithic housing 50 with a conical frustum shaped x-ray tube casing 12. The x-ray tube casing 12 includes a frustum angle 51, which is an angle of narrowing of an outer surface of the conical frustum shape.

Figure 6:
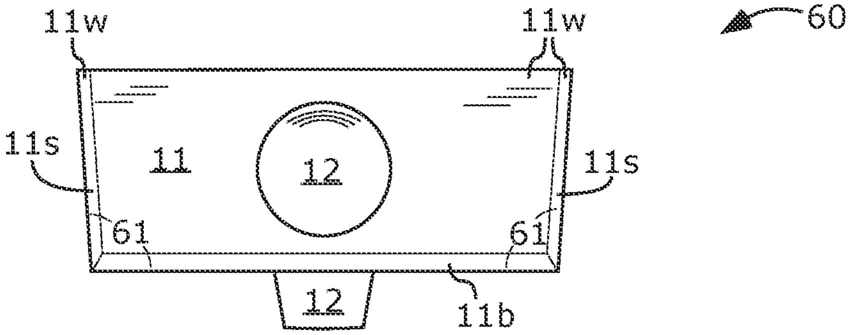

FIG. 6 is an end-view of a monolithic housing 60 with a base-side inner angle 61, between the base 11*b* and the sides 1 is, that is greater than 90°.

Figure 7:
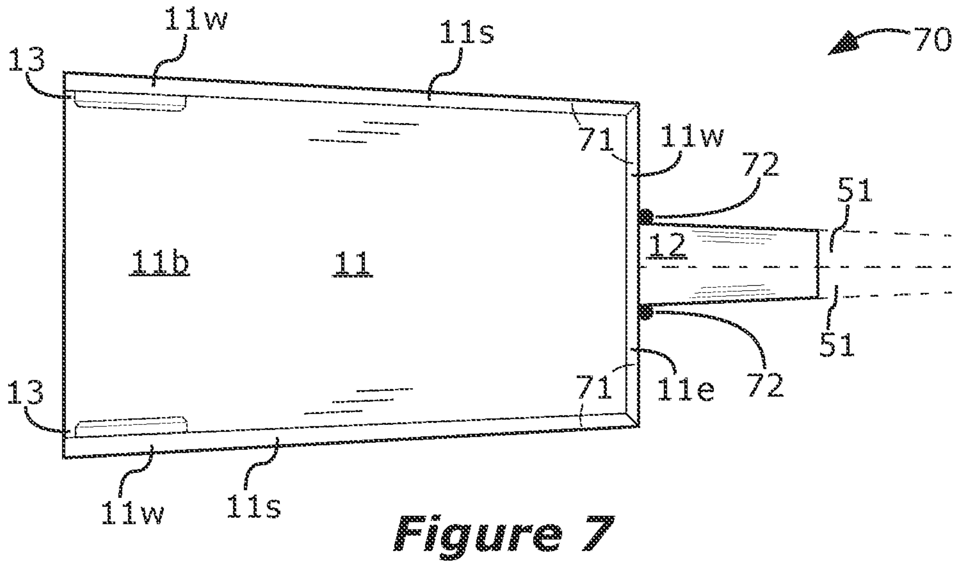

FIG. 7 is a top-view of a monolithic housing 70 with an end-side inner angle 71, between the end-wall 11*e* and each of the two sides 1 is, that is greater than 90°.

Figure 8:
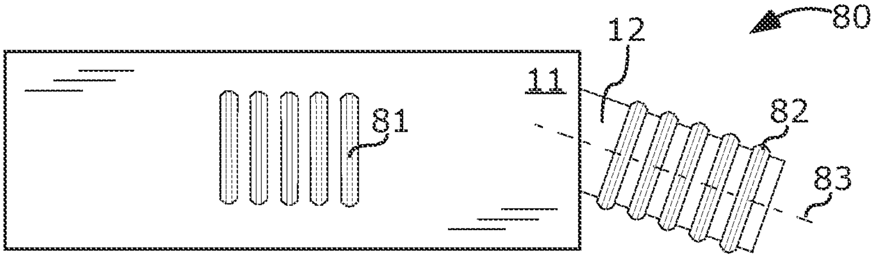

FIG. 8 is a side-view of a monolithic housing 80 with an array of ribs 81 on the power supply casing 11 and an array of ribs 82 encircling the x-ray tube casing 12. The array of ribs 82, which encircle the x-ray tube casing 12, can be perpendicular to a longitudinal axis 83 of the x-ray tube 32.

Figure 9:
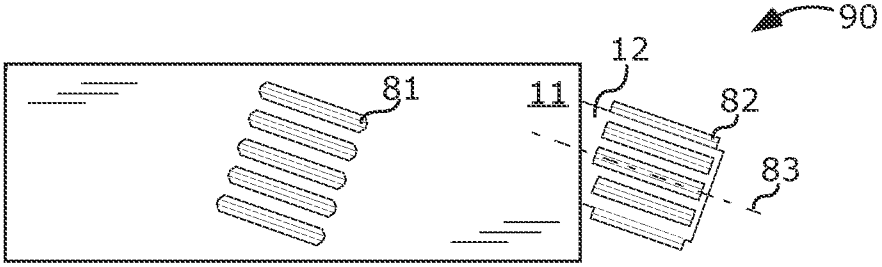

FIG. 9 is a side-view of a monolithic housing 90 with an array of ribs 81 on the power supply casing 11 and an array of ribs 82 encircling the x-ray tube casing 12. The array of ribs 82, which encircle the x-ray tube casing 12, can be parallel to the longitudinal axis 83 of the x-ray tube 32.

Figure 10:
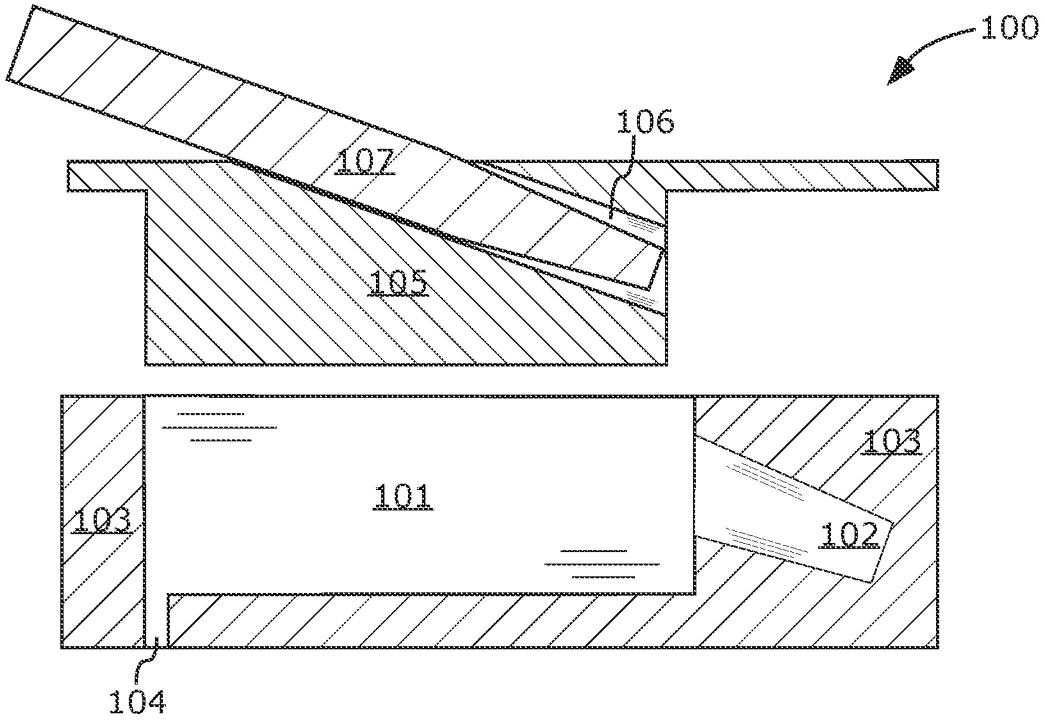
Figure 11:
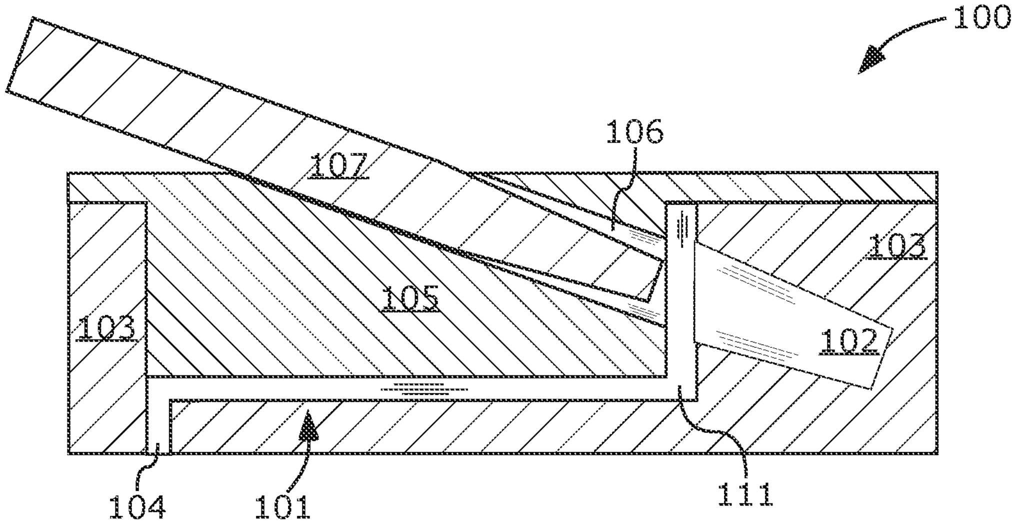
Figure 24:
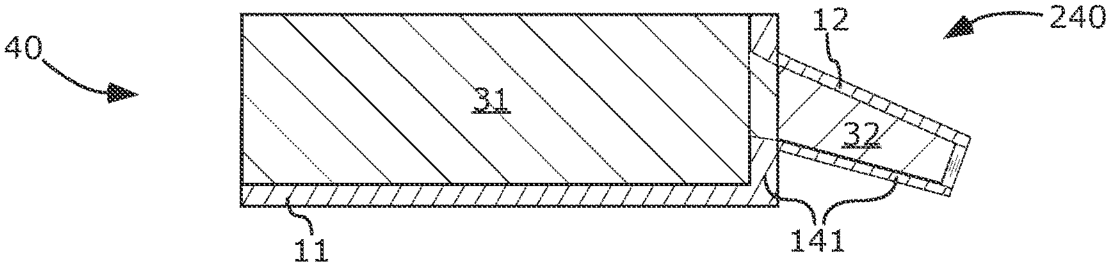

FIGS. 10-11 are cross-sectional side-views of a step 100 of a method of making a housing 141 (see FIGS. 14-17) for an x-ray source 40 (see FIG. 24). Step 100 can include inserting an upper-mold 105 into a hollow-region 101 of a lower-mold 103, forming a power supply casing cavity 111 between the upper-mold 105 and the lower-mold 103.

Figure 12:
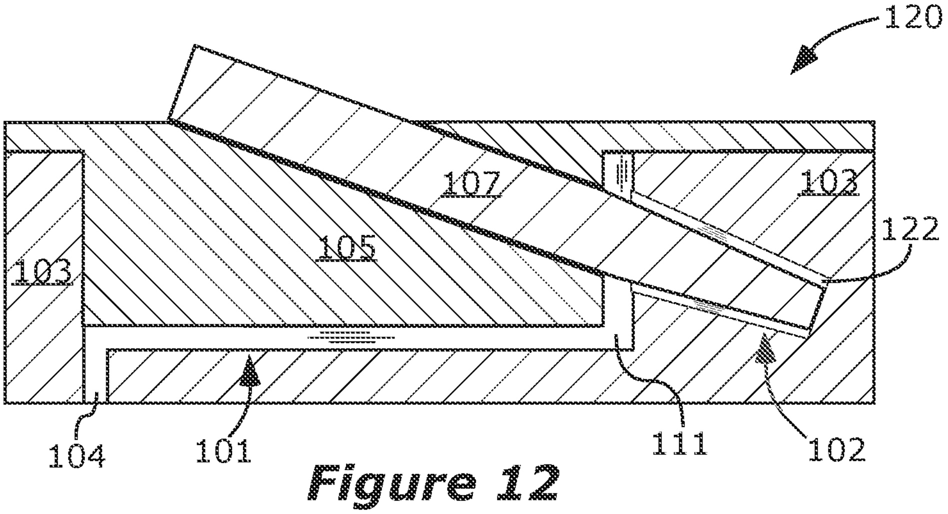

FIG. 12 is a cross-sectional side-view of a step 120 of a method of making a housing 141 for an x-ray source 40, which can follow step 100. Step 120 can include inserting a slider-pin 107 from the upper-mold 105 into a hole 102 at a sidewall of the hollow-region 101, forming an x-ray tube casing cavity 122 between the slider-pin 107 and walls of the hole 102.

Figure 13:
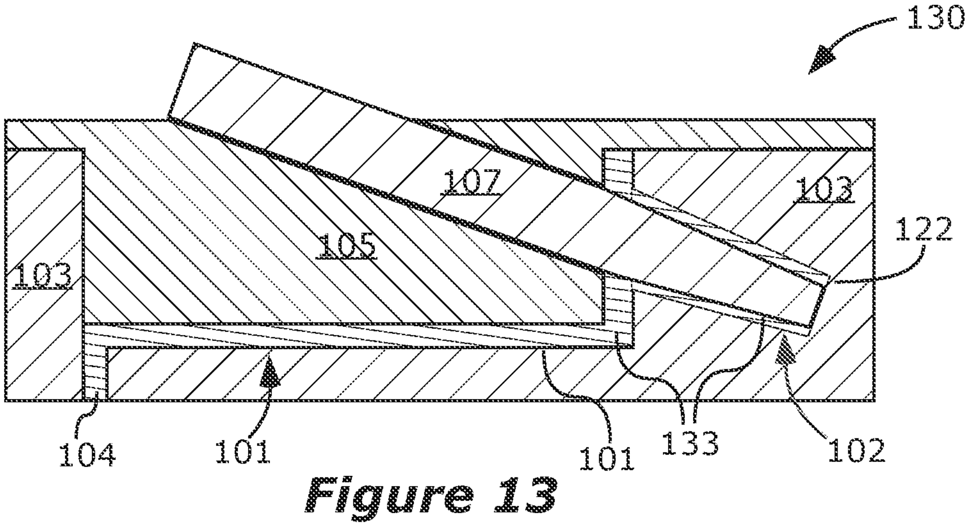

FIG. 13 is a cross-sectional side-view of a step 130 of a method of making a housing 141 for an x-ray source 40, which can follow step 120. Step 130 can include injecting (e.g. through port 104) material 133 for the housing 10 into the power supply casing cavity 111 and into the x-ray tube casing cavity 122.

Figure 14:
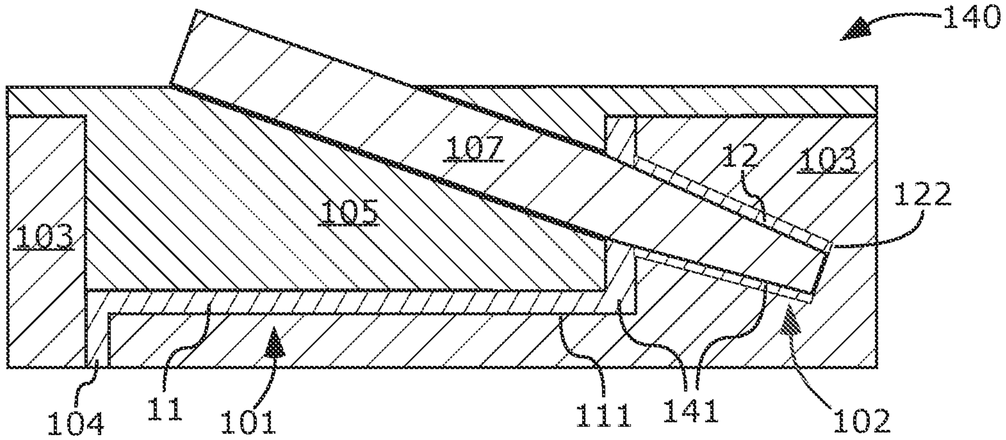

FIG. 14 is a cross-sectional side-view of a step 140 of a method of making a housing 141 for an x-ray source 40, which can follow step 130. Step 140 can include allowing the material 133 to solidify into the housing 141. The housing 10 can include a power supply casing 11 formed in the power supply casing cavity 111 and an x-ray tube casing 12 formed in the x-ray tube casing cavity 122.

Figure 15:
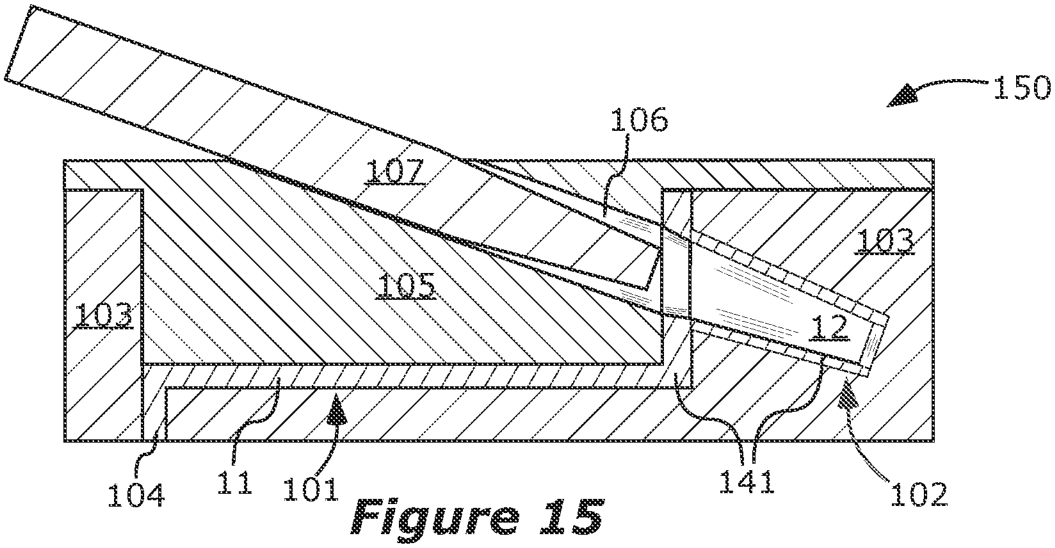

FIG. 15 is a cross-sectional side-view of a step 150 of a method of making a housing 141 for an x-ray source 40, which can follow step 140. Step 150 can include removing the slider-pin 107 from the hole 102 of the lower-mold 103.

Figure 16:
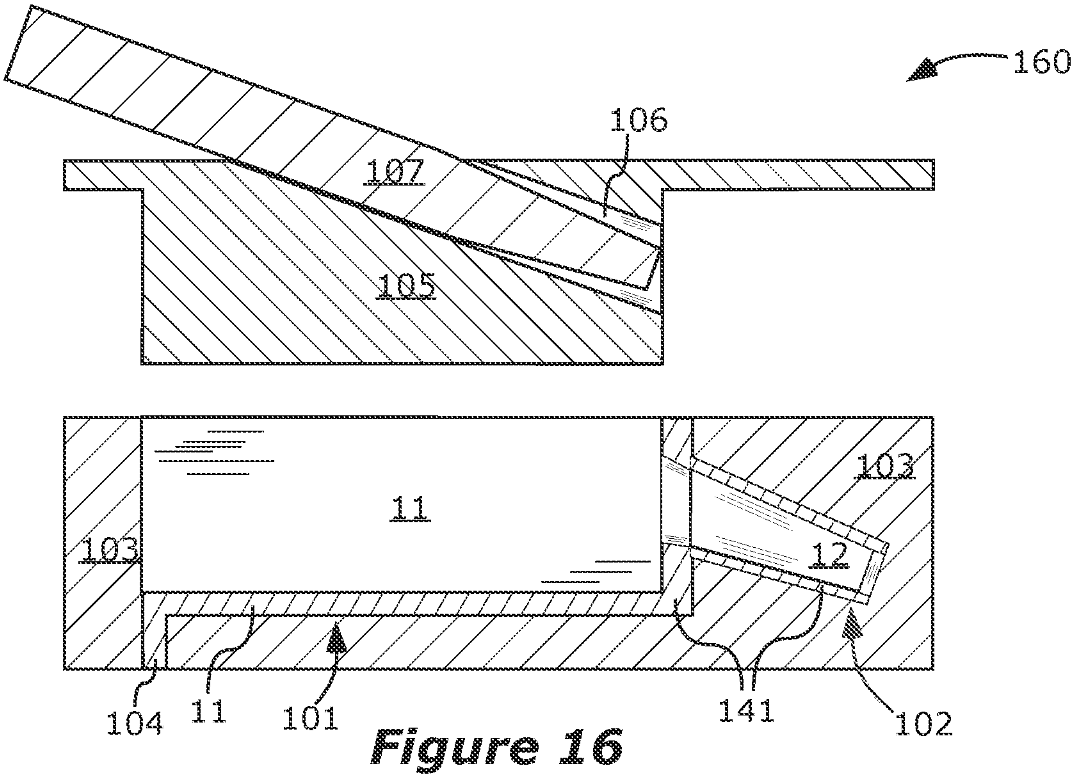

FIG. 16 is a cross-sectional side-view of a step 160 of a method of making a housing 141 for an x-ray source 40, which can follow step 150. Step 160 can include removing the upper-mold 105 from the hollow-region 101 of the lower-mold 103.

Figure 17:
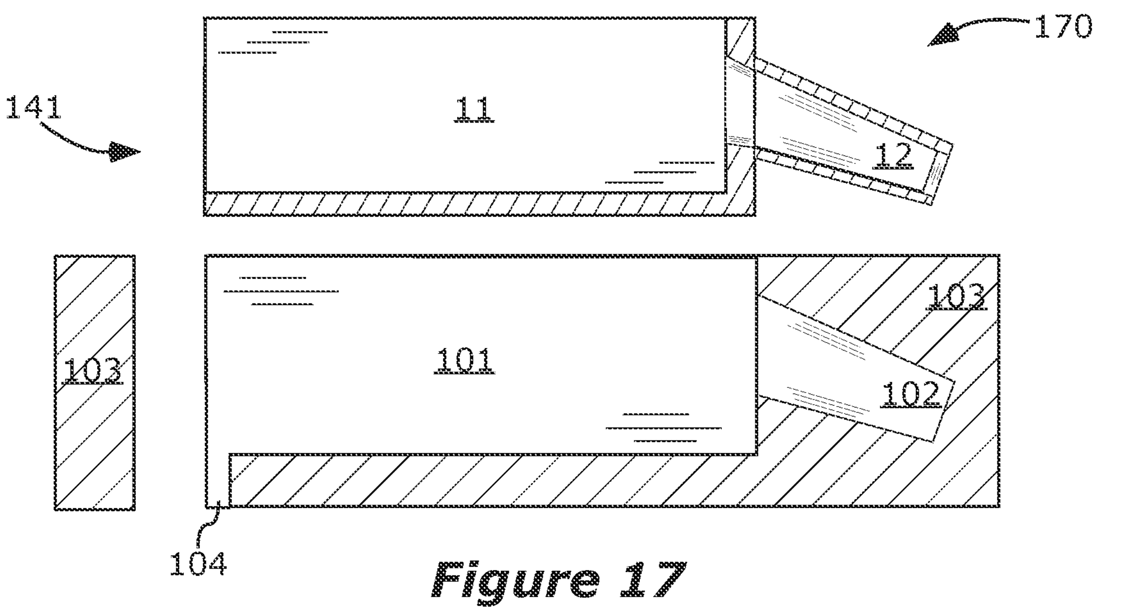

FIG. 17 is a cross-sectional side-view of a step 170 of a method of making a housing 141 for an x-ray source 40, which can follow step 160. Step 170 can include removing the housing 141 from the hollow-region 101 and from the hole 102 of the lower-mold 103.

Figure 18:
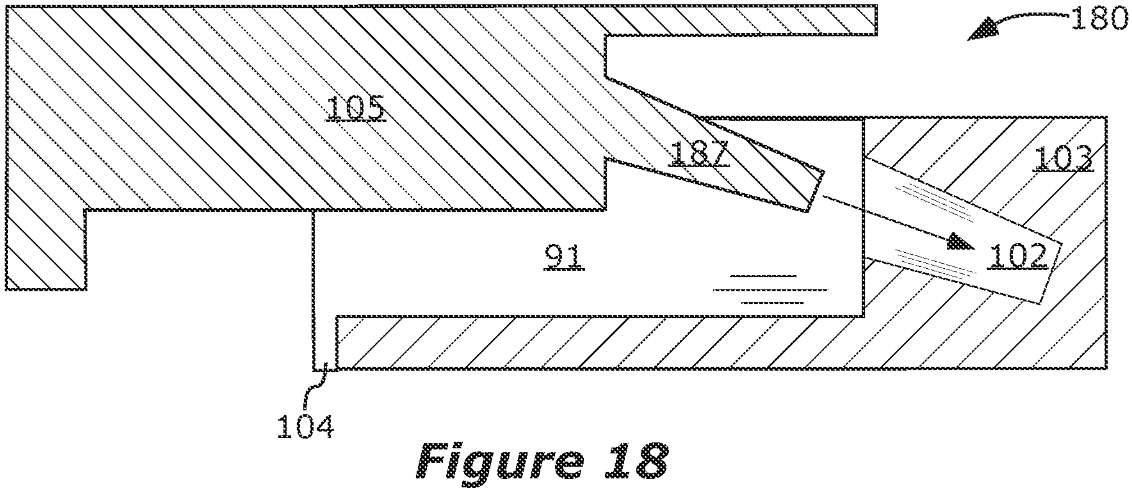
Figure 19:
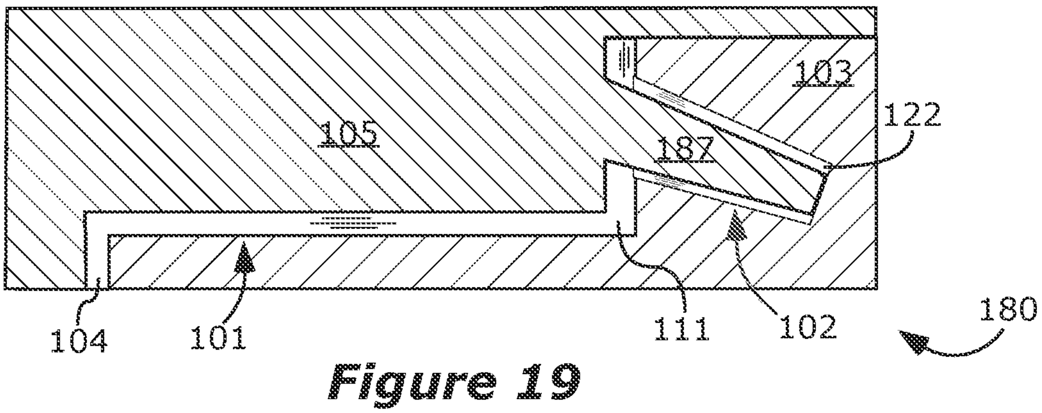

FIGS. 18-19 are cross-sectional side-views of a step 180 of a method of making a housing 141 (see FIGS. 21-23) for an x-ray source 40 (see FIG. 24). Step 180 can include (a) inserting an upper-mold 105 into a hollow-region 101 of a lower-mold 103, forming a power supply casing cavity 111 between the upper-mold 105 and the lower-mold 103, and (b) inserting a pin 187 into a hole 102 at a sidewall of the hollow-region 101, forming an x-ray tube casing cavity 122 between the pin 187 and walls of the hole 102.

Figure 20:
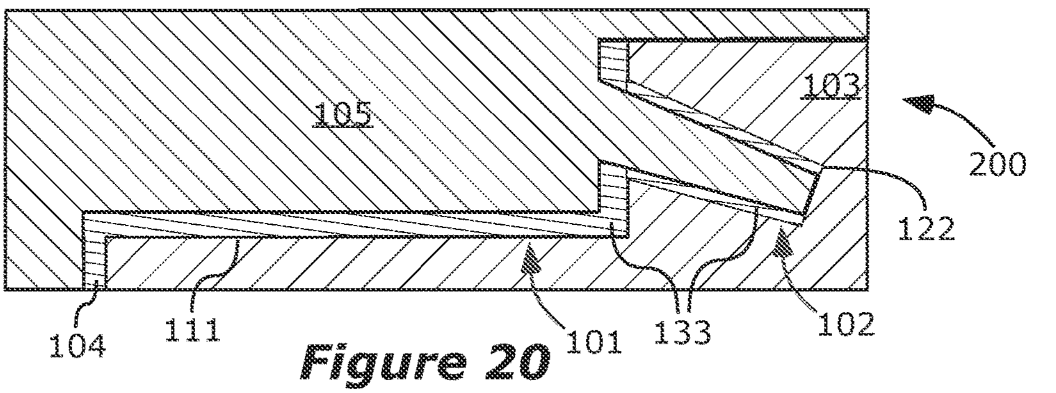

FIG. 20 is a cross-sectional side-view of a step 200 of a method of making a housing 141 for an x-ray source 40, which can follow step 180. Step 200 can include injecting (e.g. through port 104) material 133 for the housing 141 into the power supply casing cavity 111 and the x-ray tube casing cavity 122.

Figure 21:
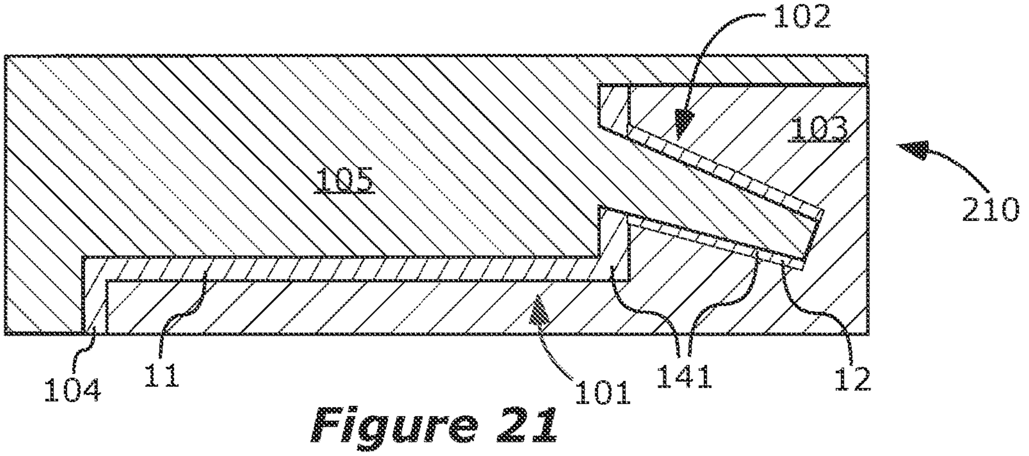

FIG. 21 is a cross-sectional side-view of a step 210 of a method of making a housing 141 for an x-ray source 40, which can follow step 200. Step 210 can include allowing the material 133 to solidify into the housing 141. The housing 141 can include a power supply casing 11 formed in the power supply casing cavity 111 and an x-ray tube casing 12 formed in the x-ray tube casing cavity 122.

Figure 22:
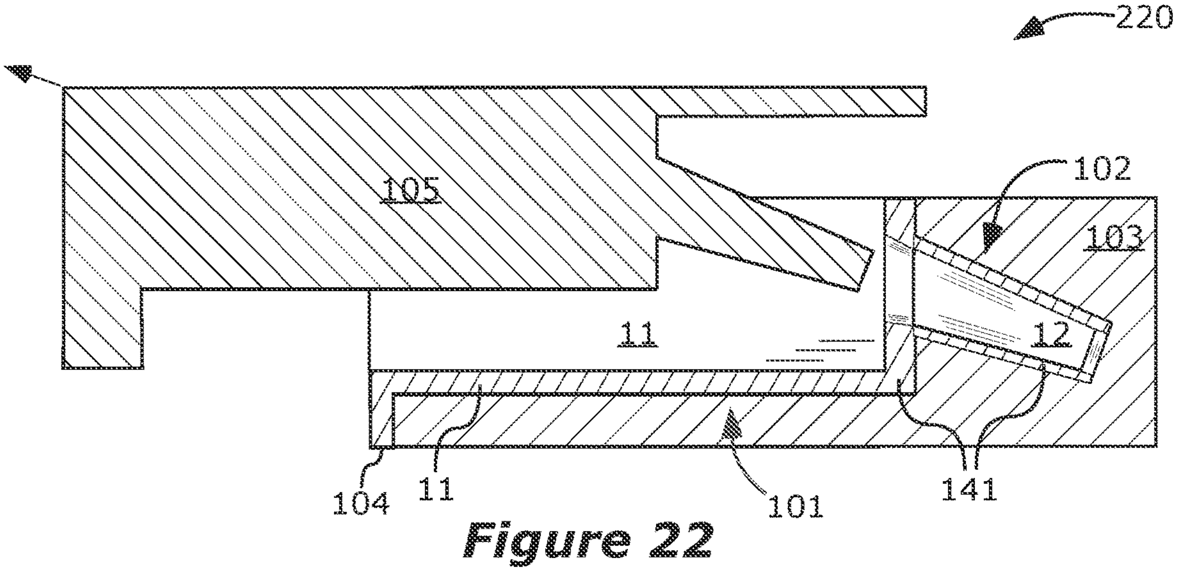

FIG. 22 is a cross-sectional side-view of a step 220 of a method of making a housing 10 for an x-ray source 40, which can follow step 210. Step 220 can include removing the upper-mold 105 from the hollow-region 101 of the lower-mold 103 and removing the pin 187 from the hole 102 of the lower-mold 103.

Figure 23:
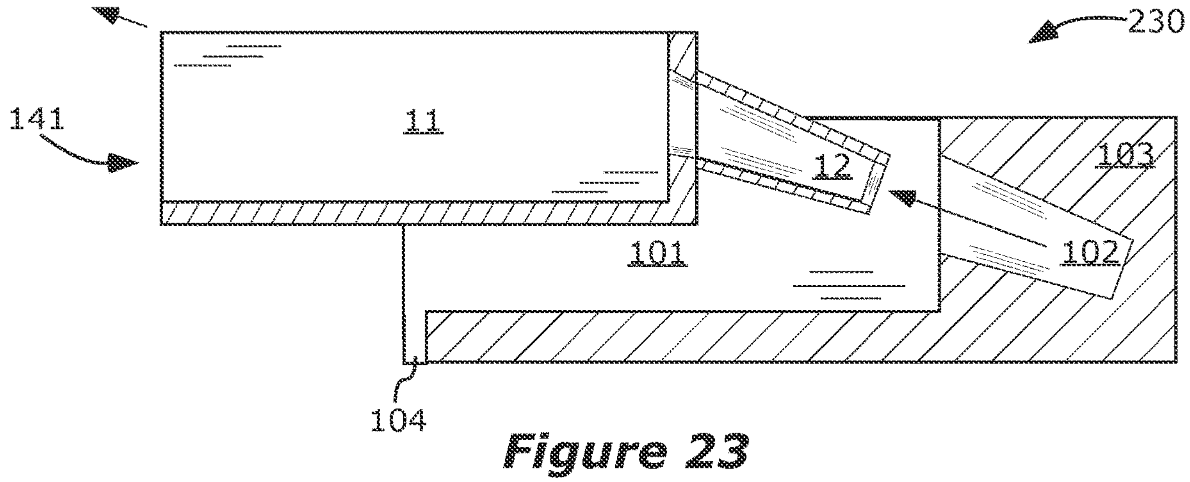

FIG. 23 is a cross-sectional side-view of a step 230 of a method of making a housing 141 for an x-ray source 40, which can follow step 220. Step 230 can include removing the housing 141 from the lower-mold 103 and from the hole 102.

FIG. 24 is a cross-sectional side-view of a step 240 of a method of making an x-ray source 40, which can follow step 170 or step 230. Step 240 can include inserting an x-ray tube 32 into the x-ray tube casing 12 and a power supply 31 into the power supply casing 11.

Figure 25:
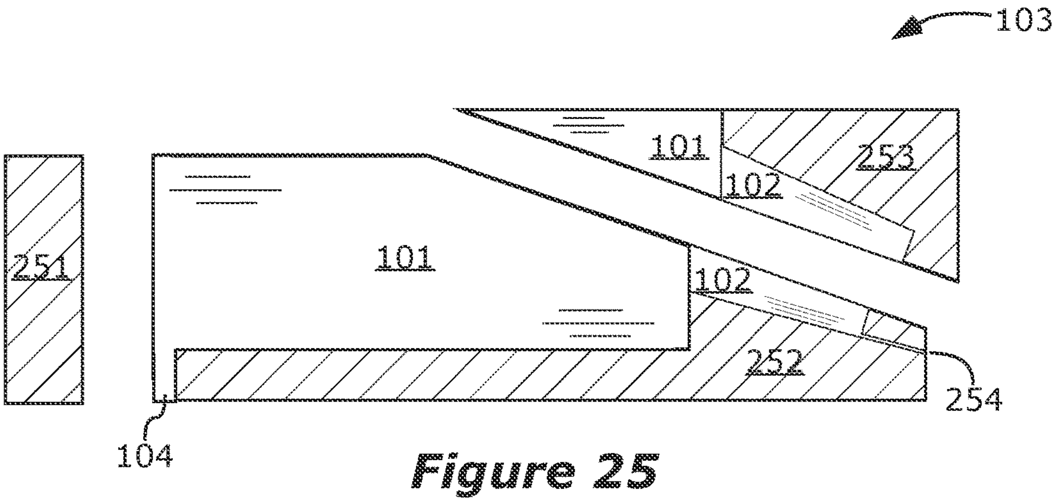

FIG. 25 is a cross-sectional side-view of the lower-mold 103 with three sections 251, 252, and 253. This lower-mold 103 may be used in the methods described herein.

Definitions. The following definitions, including plurals of the same, apply throughout this patent application.

As used herein, the phrase "dispersed evenly" means dispersed exactly evenly; dispersed evenly within normal manufacturing tolerances; or dispersed almost exactly evenly, such that any deviation from dispersed exactly evenly would have negligible effect for ordinary use of the device.

As used herein, the terms "on", "located on", "located at", and "located over" mean located directly on or located over with some other material between. The terms "located directly on", "adjoin", "adjoins", and "adjoining" mean direct and immediate contact.

As used herein, the term "monolithic" means seamless and continuous. A monolithic structure herein has the same material composition throughout. For example, a concrete wall, formed at a single time in a single pouring step, followed by a single curing step, is monolithic. As another example, a housing, formed at a single time in a single injection-molding step, is monolithic.

As used herein, the term "integrally-joined" and "integral" mean that the integrally-joined devices are formed together at the same time and are continuous without seams or joints between them.

As used herein, the term "parallel" means exactly parallel; parallel within normal manufacturing tolerances; or almost exactly parallel, such that any deviation from exactly parallel would have negligible effect for ordinary use of the device.

As used herein, the term "perpendicular" means exactly perpendicular; perpendicular within normal manufacturing tolerances; or almost exactly perpendicular, such that any deviation from exactly perpendicular would have negligible effect for ordinary use of the device.

As used herein, the term "same material composition" means exactly the same, the same within normal manufacturing tolerances, or nearly the same, such that any deviation from exactly the same would have negligible effect for ordinary use of the device.

As used herein, the term "x-ray tube" is not limited to tubular/cylindrical shaped devices. The term "tube" is used because this is the standard term used for x-ray emitting devices.

As used herein, the term "Al" means aluminum, "Ca" means calcium, "Cu" means copper, "Fe" means iron, "Mg" means magnesium, "Mn" means manganese, "Ni" means nickel, "Si" means silicon, "Sr" means strontium, and "Zn" means zinc.

As used here, the term "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

DETAILED DESCRIPTION

An x-ray source 40 can include an x-ray tube 32 and a power supply 31 enclosed within a housing. Desirable characteristics of the housing include (a) light weight (for easier transport), (b) high electrical conductivity (to protect the user from electrical shock), (c) high thermal conductivity (to remove heat generated during use), (d) corrosion resistance, (e) high strength, and (f) high electromagnetic interference shielding (to shield power supply components from external noise, to shield other electronic components from power supply noise, or both).

The invention includes a monolithic housing for an x-ray source 40. The monolithic housing can be part of an enclosure for the x-ray source 40. The monolithic housing can wrap at least partially around the power supply 31 and the x-ray tube 32. The invention also includes methods of making a monolithic housing for an x-ray source 40. The monolithic housings described herein, and housings made by these methods, can satisfy the needs of the prior paragraph. Each example housing or method may satisfy one, some, or all of these needs.

A monolithic housing 10 for an x-ray source is illustrated in FIGS. 1-2. Characteristics of monolithic housing 10 can be combined with the characteristics of any other monolithic housing herein.

The monolithic housing 10 can include a power supply casing 11 and an x-ray tube casing 12. The power supply casing 11 and the x-ray tube casing 12 can be integrally-joined together. Integrally joining the power supply casing 11 and the x-ray tube casing 12 can provide a material structure that is consistent, resulting in uniform properties throughout. Integrally joining the power supply casing 11 and the x-ray tube casing 12 can minimize gaps and seams. Such gaps or seams could otherwise result in undesirable electrical charge flow paths along an edge, or contact resistance across the gap or seam. Without such gaps and seams, heat flow can be uniform and less interrupted.

The power supply casing 11 can have a cavity for insertion of a power supply 31. The x-ray tube casing 12 can have a hollow for insertion of an x-ray tube 32. The cavity of the power supply casing 11 can adjoin the hollow of the x-ray tube casing 12 to allow insertion of an x-ray source with an x-ray tube 32 and a power supply 31. The x-ray tube 32 can be rigidly-mounted to the power supply 31.

An x-ray source 30, with a power supply 31 electrically coupled to an x-ray tube 32, is illustrated in FIG. 3.

An x-ray source 40, with a power supply 31 inside of the power supply casing 11 and an x-ray tube 32 inside of the x-ray tube casing 12, is illustrated in FIG. 4. The monolithic housing 10 can extend from a distal end **31*d* of the power supply 31, farthest from the x-ray tube 32, to the x-ray tube 32 so that the power supply 31 can be substantially covered and can resist electrical shock. The monolithic housing 10 can extend from a distal end 32*d* of the x-ray tube 32, farthest from the power supply 31, to the power supply 31 so that the x-ray tube 32** can be substantially covered and can resist electrical shock.

The x-ray tube 32 can be fully enclosed by the x-ray tube casing 12 and the power supply 31, except for a small opening to allow emission of x-rays from the x-ray tube 32, and can resist electrical shock. For example, ≥90%, ≥95%, or ≥98% of the x-ray tube 32 can be enclosed by the x-ray tube casing 12 and the power supply 31.

The power supply casing 11 can wrap at least partially around the power supply 31. The power supply casing 11 can include three sidewalls 11_w_ and a base 11_b_, and thus enclose the power supply 31 on four of six sides to resist electrical shock.

There can be interior rib(s) 13 on an inner-face of sidewalls 11_w_ of the power supply casing 11 (see FIGS. 1-2 and 7). The interior rib(s) 13 can be integral with the power supply casing 11. The interior rib(s) 13 can increase strength of the sidewalls 11_w_. A longitudinal dimension of the interior rib(s) 13 can be parallel to a longitudinal axis of the x-ray tube casing 12, for easier removal from a mold during manufacturing.

The x-ray tube casing 12 can wrap at least partially around the x-ray tube 32. The x-ray tube casing 12 can encircle the x-ray tube 32. The x-ray tube casing 12 can encircle the x-ray tube 32 along a length of the x-ray tube from a cathode to an x-ray window of the x-ray tube 32. The x-ray tube casing 12 can encircle the x-ray tube 32 along a major portion of a length of the x-ray tube 32, such as for example along ≥50%, ≥75%, or ≥90% of the length. Even if the x-ray tube casing 12 does not encircle the x-ray tube 32 along a majority of its length, it can be helpful for the x-ray tube casing 12 to encircle electrical connections between the power supply 31 and the x-ray tube 32. Thus, electrical shock can be resisted.

The monolithic housing 10 can be a single, integral unit formed by injection molding, as described below. Pellets having the following composition can be fed by a heated screw into the mold.

The monolithic housing 10 can include one or some of the following chemical elements. The material of the monolithic housing 10 can be selected to facilitate electrical shielding, electrical conductivity, and/or heat dissipation. Total weight percent of all chemical elements is 100%.

The monolithic housing 10 can include Mg. For example, a minimum weight percent Mg can be ≥50%, ≥75%, or ≥85%. Example maximum weight percent Mg can include ≤85%, ≤95%, or ≤99%. Mg can be dispersed evenly throughout the monolithic housing 10.

The monolithic housing 10 can include Al. For example, a minimum weight percent Al can be ≥2%, ≥4%, or ≥8%. Example maximum weight percent Al include ≤8%, K 14%, or ≤20%. Al can be dispersed evenly throughout the monolithic housing 10.

The monolithic housing 10 can include Zn. For example, a minimum weight percent Zn can be ≥0.1%, ≥0.3%, or ≥0.7%. Example maximum weight percent Zn include ≤0.8%, ≤1.2%, or ≤3%. Zn can be dispersed evenly throughout the monolithic housing 10.

The monolithic housing 10 can include Al, Mg, Mn, and Zn. The monolithic housing 10 can include Al, Cu, Fe, Mg, Mn, Ni, Si, and Zn. The monolithic housing 10 can include Al, Ca, Cu, Fe, Mg, Mn, Ni, Si, Sr, and Zn. These chemical elements can be dispersed evenly throughout the monolithic housing 10 to achieve optimum performance.

A monolithic housing 50 is illustrated in FIG. 5. Characteristics of monolithic housing 50 can be combined with the characteristics of any other monolithic housing herein.

The x-ray tube casing 12 of monolithic housing 50 has a narrowing profile. The x-ray tube casing 12 can be wider closer to the power supply casing 11, and narrow moving away from the power supply casing 11. This narrowing can be linear. The x-ray tube casing 12 can have a conical frustum shape. These shapes can allow easier integration of the x-ray source 40 and the monolithic housing 10 into other tools. In addition, these shapes can allow easier assembly of the x-ray source 40 with the monolithic housing 10.

FIG. 5 shows a frustum angle 51, which is an angle of narrowing of an outer and/or inner surface of the conical frustum shape. Example minimum values of the frustum angle 51 include ≥0.1°, ≥0.2°, ≥0.5°, and ≥1°. Example maximum values of the frustum angle 51 include ≤1°, ≤3°, ≤5°, and ≤15°.

Monolithic housings 60 and 70 are illustrated in FIGS. 6 and 7. Characteristics of these monolithic housings 60 and 70 can be combined with each other. Characteristics of these monolithic housings 60 and 70 can be combined with the characteristics of any other monolithic housing herein.

As illustrated in FIGS. 6 and 7, the power supply casing 11 can include sidewalls 11_w_ at edges of a base 11_b_. The sidewalls 11_w_ can include an end-wall 11_e_ and two sides 11_s_. The two sides 11_s_ can be opposite of each other. The end-wall 11_e_ can adjoin the x-ray tube casing 12 and the two sides 11_s_.

A base-wall inner angle 61 is an angle between the base 11_b_ and the sides 11_s_, measured inside of the power supply casing 11 (FIG. 6). The base-wall inner angle 61 can be greater than 90° to facilitate assembly of the power supply 31 with the power supply casing 11. Example minimum values of the base-side inner angle 61 include ≥90.1°, ≥90.2°, ≥90.5°, or ≥91°. Example maximum values of the base-side inner angle 61 include ≤91°, ≤93°, ≤95°, ≤100°, ≤105°, or ≤115°. These angles can facilitate also association of the monolithic housing 60 with another tool.

An end-side inner angle 71 is an angle between the end-wall 11_e_ and each of the two sides 11 is, measured inside of the power supply casing 11 (FIG. 7). The end-side inner angle 71 can be greater than 90° to facilitate assembly of the power supply 31 with the power supply casing 11. Example minimum values of the end-side inner angle 71 include ≥90.1°, ≥90.2°, ≥90.5°, and ≥91°. Example maximum values of the end-side inner angle 71 include ≤91°, ≤93°, ≤95°, ≤100°, ≤105°, or ≤115°. These angles can facilitate also association of the monolithic housing 70 with another tool.

As illustrated in FIG. 7, monolithic housing 70 can include ejection post(s) 72. The ejection post(s) 72 can strengthen the monolithic housing 70 in location(s) where mold pins push on the monolithic housing 70 to remove it from a mold. In addition, the ejection post(s) 72 can strengthen an interface between the power supply casing 11 and the x-ray tube casing 12. The ejection post(s) 72 can be adjacent to a junction of the x-ray tube casing 12 and the power supply casing 11.

Monolithic housings 80 and 90 are illustrated in FIGS. 8 and 9. Characteristics of these monolithic housings 80 and 90 can be combined with each other. Characteristics of these monolithic housings 80 and 90 can be combined with the characteristics of any other monolithic housing herein.

Monolithic housings 80 and 90 include an array of ribs 81 on an exterior of the power supply casing 11 and an array of ribs 82 encircling the x-ray tube casing 12. One or both arrays of ribs 81 and 82 can be part of a monolithic housing 80 or 90, and thus integral with the rest of the monolithic housing 80 or 90. These arrays of ribs 81 and 82 can stiffen the x-ray tube casing 12, thus increasing its durability. These arrays of ribs 81 and 82 can remove heat from the housings 80 and 90. Contact resistance between separate devices can be avoided by forming the arrays of ribs 81 and 82 as part of the monolithic housing 80 or 90.

Both arrays of ribs 81 and 82 may be used. Only one array of ribs 81 or 82 may be used.

The array of ribs 81 on the power supply casing 11 can be adjacent to a transformer in the power supply 31. Thus, the array of ribs 81 can target heat removal at a location of heat generation.

As illustrated in FIG. 8, each rib of the array of ribs 82 can encircle the x-ray tube 32. Each rib of the array of ribs 82 can be perpendicular to a longitudinal axis 83 of the x-ray tube 32. Additional mold sections might be needed to allow removal of this monolithic housing 80 from the mold following injection molding. As illustrated in FIG. 9, each rib of the array of ribs 82 can be parallel to the longitudinal axis 83 of the x-ray tube 32. The example of FIG. 8 or the example of FIG. 9 can be selected based on direction of air flow, space available, and manufacturability (e.g. ability to remove from the mold). The perpendicular or parallel orientation of the array of ribs 82 can accommodate air flow conditions for optimal cooling.

First Method

A first method of making a housing 141 for an x-ray source, or making an x-ray source 40, can include some or all of the following steps. These steps can be performed in the following order or other order if so specified. Some of the steps can be performed simultaneously unless explicitly noted otherwise in the claims. The housing 141 and the x-ray source 40 can have the properties of any monolithic housing described above.

Step 100 can include inserting an upper-mold 105 into a hollow-region 101 of a lower-mold 103, forming a power supply casing cavity 111 between the upper-mold 105 and the lower-mold 103. See FIGS. 10-11.

Step 120 can include inserting a slider-pin 107 from the upper-mold 105 into a hole 102 at a sidewall of the hollow-region 101, forming an x-ray tube casing cavity 122 between the slider-pin 107 and walls of the hole 102. The upper-mold 105 can include a channel 106 (FIG. 15) to allow the slider-pin 107 to move into the upper-mold 105. Step 120 can follow step 100. See FIG. 12.

Step 130 can include injecting (e.g. through port 104 to port 254 in FIG. 25) material 133 for the housing into the power supply casing cavity 111 and the x-ray tube casing cavity 122. The material 133 can be injected by thixotropic methods. Step 130 can follow step 120. See FIGS. 13 and 25.

Step 140 can include allowing the material 133 for the housing to solidify into a housing 141 for an x-ray source 40. The housing 141 can include a power supply casing 11 formed in the power supply casing cavity 111 and an x-ray tube casing 12 formed in the x-ray tube casing cavity 122. The power supply casing 11 and the x-ray tube casing 12 can be integral and monolithic. Step 140 can follow step 130. See FIG. 14.

Step 150 can include removing the slider-pin 107 from the hole 102 of the lower-mold 103. The upper-mold 105 can include a channel 106 to allow the slider-pin 107 to move out of the upper-mold 105. Step 150 can follow step 140. See FIG. 15.

Step 160 can include removing the upper-mold 105 from the hollow-region 101 (FIG. 10) of the lower-mold 103. Step 160 can follow step 150. See FIG. 16.

Step 170 can include removing the housing 141 from the lower-mold 103. Step 170 can follow step 160. The lower-mold 103 can include three sections 251, 252, and 253, or at least three sections for easier removal of the housing 141. Step 170 can include pressing on ejection post(s) 72 to eject the housing 141 from the lower-mold 103. The ejection post(s) 72 are described above. See FIGS. 7, 17, and 25.

Step 240 can include inserting an x-ray tube 32 into the x-ray tube casing 12 and a power supply 31 into the power supply casing 11, thus forming an enclosed x-ray source 40. Step 240 can follow step 170. See FIG. 24.

Additional sheet(s) of material can be attached (e.g. bolted, glued, snapped into place, etc.) onto portion(s) of the power supply not covered by the power supply casing 11. The sheet(s) of material can be metallic.

FIG. 25 is a cross-sectional side-view of the lower-mold 103 with three sections 251, 252, and 253. This lower-mold 103 may be used in the methods described herein.

Second Method

A second method of making a housing 141 for an x-ray source, or making an x-ray source 40, can include some or all of the following steps. These steps can be performed in the following order or other order if so specified. Some of the steps can be performed simultaneously unless explicitly noted otherwise in the claims. The housing 141 and the x-ray source 40 can have the properties of any monolithic housing described above.

Step 180 can include (a) inserting an upper-mold 105 into a hollow-region 101 of a lower-mold 103, forming a power supply casing cavity 111 between the upper-mold 105 and the lower-mold 103, and (b) inserting a pin 187 into a hole 102 at a sidewall of the hollow-region 101, forming an x-ray tube casing cavity 122 between the pin 187 and walls of the hole 102. The pin 187 can be integral and monolithic with the upper-mold 105. Upper-mold 105 insertion into the hollow-region 101 can be simultaneous with pin 187 insertion into the hole 102. The upper-mold 105 and the pin 187 can be inserted at an angle as shown. See FIGS. 18-19.

Step 200 can include injecting (e.g. through port 104 to port 254 in FIG. 25) material 133 for the housing 141 into the power supply casing cavity 111 and into the x-ray tube casing cavity 122. The material 133 can be injected by thixotropic methods. Step 200 can follow step 180. See FIGS. 20 and 25.

Step 210 can include allowing the material 133 for the housing to solidify into a housing 141 for an x-ray source 40. The housing 141 can include a power supply casing 11 formed in the power supply casing cavity 111 and an x-ray tube casing 12 formed in the x-ray tube casing cavity 122. The power supply casing 11 and the x-ray tube casing 12 can be integral and monolithic. Step 210 can follow step 200. See FIG. 21.

Step 220 can include removing the upper-mold 105 from the hollow-region 101 of the lower-mold 103 and removing the pin 187 from the hole 102 of the lower-mold 103. Upper-mold 105 removal from the hollow-region 101 can be simultaneous with pin 187 removal from the hole 102. The upper-mold 105 and the pin 187 can be removed at an angle as shown. Step 220 can follow step 210. See FIG. 22.

Step 230 can include removing the housing 141 from the lower-mold 103. The housing 141 can be removed at an angle as shown. Step 230 can follow step 220. The lower-mold 103 can include three sections 251, 252, and 253, or at least three sections for easier removal of the housing 141. Step 170 can include pressing on ejection post(s) 72 to eject the housing 141 from the lower-mold 103. The ejection post(s) 72 are described above. See FIGS. 7, 23, and 25.

Step 240 can include inserting an x-ray tube 32 into the x-ray tube casing 12 and a power supply 31 into the power supply casing 11, thus forming an enclosed x-ray source 40. Step 240 can follow step 230. See FIG. 24.

Additional sheet(s) of material can be attached (e.g. bolted, glued, snapped into place, etc.) onto portion(s) of the power supply not covered by the power supply casing 11. The sheet(s) of material can be metallic.

What is claimed is:

1. A method of making a housing for an x-ray source, the method comprising:

step 1: inserting an upper-mold into a hollow-region of a lower-mold, forming a power supply casing cavity between the upper-mold and the lower-mold;

step 2: inserting a slider-pin from the upper-mold into a hole at a sidewall of the hollow-region, forming an x-ray tube casing cavity between the slider-pin and walls of the hole;

step 3: injecting material for the housing into the power supply casing cavity and the x-ray tube casing cavity, and allowing the material for the housing to solidify into a housing for an x-ray source, the housing including a power supply casing formed in the power supply casing cavity and an x-ray tube casing formed in the x-ray tube casing cavity;

step 4: removing the slider-pin from the hole of the lower-mold;

step 5: removing the upper-mold from the hollow-region of the lower-mold; and step 6: removing the housing from the lower-mold.

2. The method of claim 1, wherein the housing includes aluminum.

3. The method of claim 1, wherein the housing includes iron.

4. The method of claim 1, wherein step 6 includes pressing on an ejection post to remove the housing from the lower-mold.

5. The method of claim 1, wherein the steps are performed in the following order: step 1, step 2, step 3, step 4, step 5, and then step 6.

6. The method of claim 1, wherein the power supply casing and the x-ray tube casing are integral and monolithic.

7. The method of claim 1, wherein material for the housing is injected by thixotropic methods.

8. The method of claim 1, wherein the upper-mold includes a channel to allow the slider-pin to move into and out of the upper-mold.

9. The method of claim 1, further comprising inserting an x-ray tube into the x-ray tube casing and a power supply into the power supply casing.

10. A method of making a housing for an x-ray source, the method comprising:

step 1: (a) inserting an upper-mold into a hollow-region of a lower-mold, forming a power supply casing cavity between the upper-mold and the lower-mold, and (b) inserting a pin into a hole at a sidewall of the hollow-region, forming an x-ray tube casing cavity between the pin and walls of the hole;

step 2: injecting material for the housing into the power supply casing cavity and the x-ray tube casing cavity, and allowing the material for the housing to solidify into a housing for an x-ray source, the housing including a power supply casing formed in the power supply casing cavity and an x-ray tube casing formed in the x-ray tube casing cavity;

step 3: removing the upper-mold from the hollow-region of the lower-mold and removing the pin from the hole; and step 4: removing the housing from the lower-mold.

11. The method of claim 10, wherein the housing includes aluminum.

12. The method of claim 10, wherein the lower-mold includes at least three sections.

13. The method of claim 10, wherein step 4 includes pressing on an ejection post to remove the housing from the lower-mold.

14. The method of claim 10, wherein removing the upper-mold from the hollow-region of the lower-mold is simultaneous with removing the pin from the hole.

15. The method of claim 10, wherein the power supply casing and the x-ray tube casing are integral and monolithic.

16. The method of claim 10, wherein the pin is integral and monolithic with the upper-mold, and inserting the upper-mold into the hollow-region is simultaneous with inserting the pin into the hole.

17. The method of claim 10, wherein material for the housing is injected by thixotropic methods.

18. The method of claim 10, wherein the steps are performed in the following order: step 1, step 2, step 3, and then step 4.

19. The method of claim 10, wherein:

the pin is a slider-pin;

step 1 further comprises inserting the slider-pin from the upper-mold into a hole at a sidewall of the hollow-region, forming the x-ray tube casing cavity between the slider-pin and the walls of the hole; and the method further comprises, between step 2 and step 3, removing the slider-pin from the hole of the lower-mold.

20. The method of claim 10, further comprising inserting an x-ray tube into the x-ray tube casing and a power supply into the power supply casing.

* * * * *